No. 706,885. Patented Aug. 12, 1902.
R. BERG.
VALVE MECHANISM.
(Application filed Aug. 17, 1901.)
(No Model.) 2 Sheets—Sheet 1.
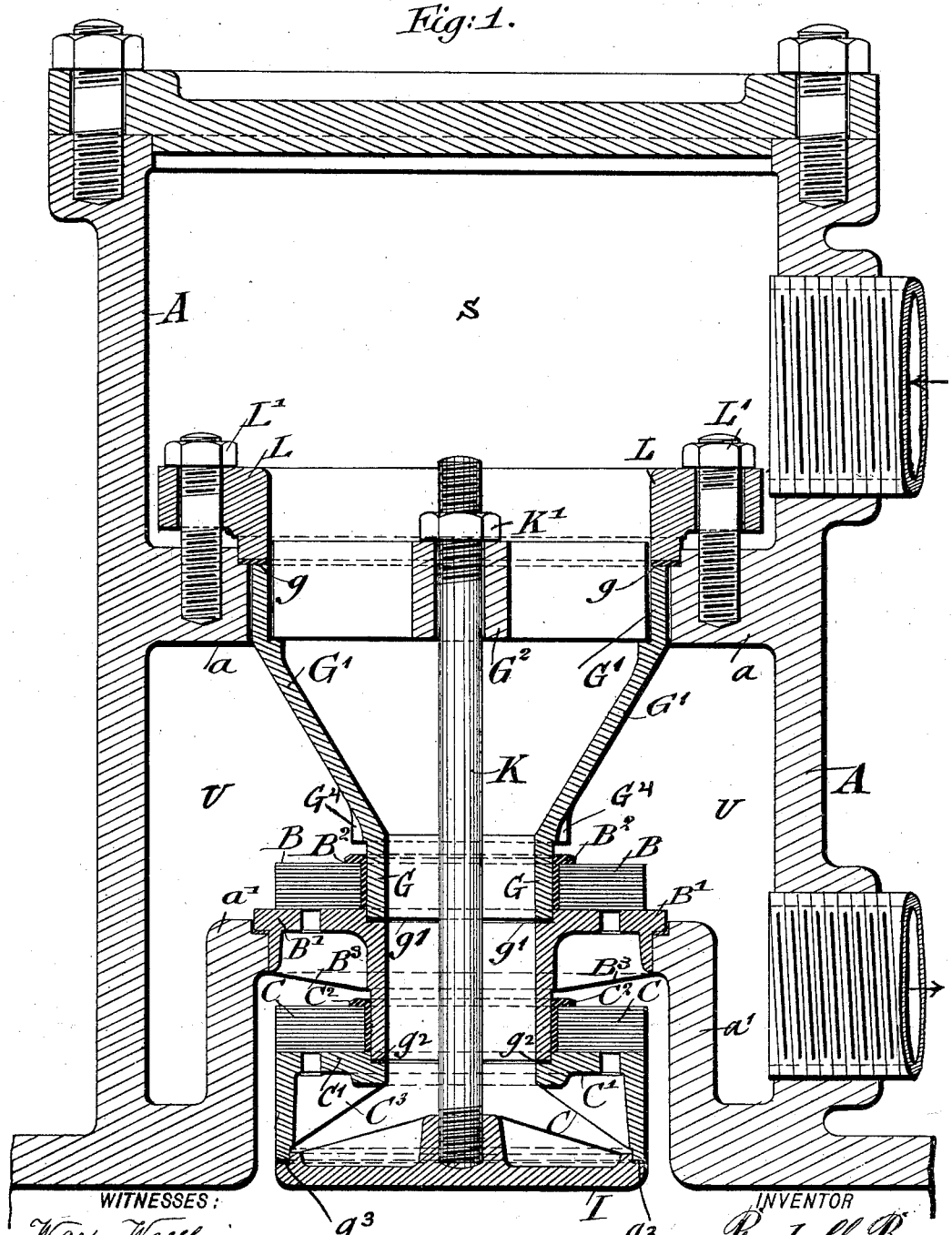

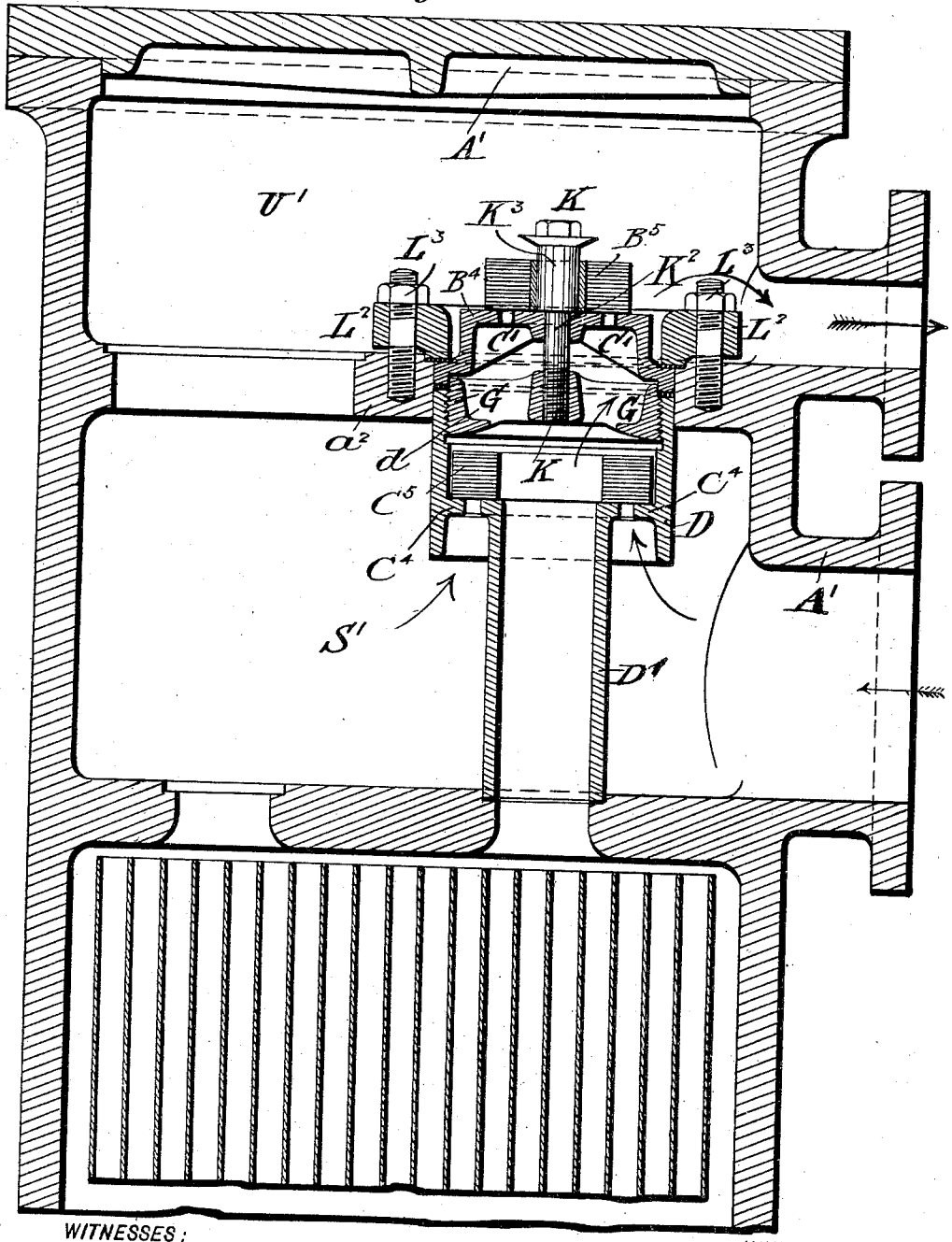

UNITED STATES PATENT OFFICE.

RUDOLF BERG, OF PITTSBURG, PENNSYLVANIA, ASSIGNOR OF ONE-HALF TO FERDINAND WENIG, OF PITTSBURG, PENNSYLVANIA.

VALVE MECHANISM.

SPECIFICATION forming part of Letters Patent No. 706,885, dated August 12, 1902.

Application filed August 17, 1901. Serial No. 72,343. (No model.)

*To all whom it may concern:*

Be it known that I, RUDOLF BERG, a citizen of the United States, residing in Pittsburg, in the county of Allegheny and the State of Pennsylvania, have invented certain new and useful Improvements in Valve Mechanisms, of which the following is a specification.

This invention relates to an improved valve mechanism for air or gas compressors, water or other pumps, in which the suction and discharge valves are of simple construction and arranged in a manner to economize space and requiring only slight motion for operation; and the invention consists of a valve mechanism which comprises a suction-valve, a discharge-valve, each formed of superposed rubber rings and a flanged bushing, valve-seats for said valves, a suction-tube for the air or fluid, means for connecting the valve-seats and suction-tube, and means for supporting the valve mechanism in proper position in the valve-casing of the compressor or pump, so as to provide a suction-chamber and a discharge-chamber in said casing, fully described hereinafter, and finally pointed out in the claims.

In the accompanying drawings, Figure 1 represents a vertical central section of one form of my improved valve mechanism for compressors or pumps, and Fig. 2 is a vertical central section of a modified construction of the same.

Similar letters of reference indicate corresponding parts.

Referring to the drawings, A represents the valve-casing of a compressor or pump, in which the valve mechanism is supported, so as to form a suction-chamber and a discharge-chamber. The valve-casing A is provided with an internal annular flange $a$, projecting inwardly from the side of the casing approximately midway between the ends, and is adapted to receive the upper end of the valve mechanism. The valve-casing A is further provided at its lower part with an annular seat $a'$, which extends in inward and upward direction, so as to form an annular space between it and the casing A, as shown in Fig. 1, and serves as a seat for supporting the valve mechanism.

The valve mechanism is composed of a suction-tube G, an annular suction-valve C, and an annular discharge-valve B, having the valve-seats C' and B', respectively, the bottom disk I, and a hanger-bolt K, which are arranged and secured together in a manner now described. The suction-tube G is frusto-conical shaped, having a large cylindrical upper end and a small cylindrical lower end. The upper end G' of the suction-tube G is provided with the central sleeve $G^2$, which is internally threaded to engage the hanger-bolt K. The valves B and C, adapted to rest upon the valve-seats B' and C', respectively, are formed of superposed rubber rings and are provided with the metallic bushings $B^2$ and $C^2$, that have protecting-flanges at their upper ends. The valve-seats B' C' are annular in shape and are provided, respectively, with an interior flange and an exterior flange and strengthened by radial ribs $B^3$ $C^3$ at their under sides. The interior flange of the valve-seat B', which is preferably the same diameter as the lower cylindrical end of the suction-tube G, is arranged centrally at the lower end of the same and guides and retains the suction-valve C, while the lower end of the suction-tube guides and retains the discharge-valve B. The lower valve-seat C' is supported at the edge of the circular bottom disk I, which latter may form an integral part of the valve-seat C' and is suspended from the upper enlarged part G' of the suction-tube G by a hanger-bolt K. The hanger-bolt K is screwed at its lower end into a central interiorly-threaded socket of the bottom disk I, while its upper threaded end is passed through a central sleeve of the spider $G^2$ and supported thereon by a screw-nut K', as shown clearly in Fig. 1. The valves B and C, the valve-seats B' C', bottom disk I, suction-tube G, and the bolt and nut K K', forming the valve mechanism, are assembled and secured together and then supported at the valve-seat B' on the annular seat $a'$ of the casing A, the upper cylindrical end G' of the suction-tube G being received internally of the annular flange $a$ of the casing. The valve mechanism thus seated and supported divides the valve-casing A' into the upper suction or inlet chamber S and the lower discharge or outlet chamber U and is secured in the valve-casing by means of the top ring L and the stud-bolts L' in the annular flange a. The adjacent contact-surfaces of the suction-tube G, the top ring L, the flanges of the valve-seats, and the bottom disk I are either carefully ground off, so as to fit tightly together, or they are provided with interposed rubber gaskets $g$ $g'$ $g^2$ $g^3$. The motion of the discharge-valve B is limited by exterior projecting lugs $G^4$ on the outside of the upper enlarged portion G' of the suction-tube G. In operation the air or liquid is drawn in from the suction or inlet chamber S above the valve mechanism through the suction-tube and the suction-valves into the piston-cylinder and then forced out through the discharge-valve into the discharge or outlet chamber U.

The modified construction of the valve mechanism, as shown in Fig. 2, consists of the casing A', that is provided with the internal partitional flange $a^2$, which has circular openings for receiving the parts of the valve. In this figure the parts of the valve are assembled in one opening only. The partitional flange $a^2$ divides the casing A' into the inlet-chamber S' and the discharge-chamber U', having the parts of the valve interposed between them. The annular suction-valve $C^5$ is arranged at the end of the suction-tube D', that is provided at its end with the enlarged cylindrical portion D, that serves for the valve-seat $C^4$ and for guiding the annular suction-valve $C^5$. Above the enlarged end D of the suction-tube is disposed the discharge-valve seat $B^4$, upon which is seated the annular discharge-valve $B^5$, that is guided by and limited in its motion by the flanged bushing $K^3$ on the hanger-bolt $K^2$. The spider $d$, externally threaded, connects with the hanger-bolt $K^2$, the externally-threaded surface engaging the enlarged end of the suction-tube, so that the valve-seats and suction-tube are held in their assembled position by said bolt. The parts thus assembled are secured in the opening of the internal flange $a^2$ by the annular ring $L^2$, that is engaged by the stud-bolts $L^3$. As indicated by the arrows, the air or water is drawn into the chamber S' and thence into the piston-chamber through the openings in the valve-seat and through the suction-tube. Upon the return motion of the piston of the pump the air or water is forced through the suction-tube, out through the discharge openings of the discharge valve-seat, and into the discharge-chamber U'.

This improved valve mechanism is especially adapted for use with air or gas compressors and also for pumps for water and other liquids. The advantages as compared with the valves heretofore in use are, first, a large number of valves can be arranged within a given space, so that the compressors or pumps can be constructed much smaller, as considerable space is saved; second, the valves require but a comparatively small motion, and consequently are subject to little wear; third, the casing forms at the same time suction and discharge chambers, so that a separate air-chamber, which was heretofore required, can be entirely dispensed with, and, lastly, shocks and hammering of the valves are entirely avoided.

Having thus described my invention, I claim as new and desire to secure by Letters Patent—

1. In a valve mechanism for compressors or pumps, the combination, with a valve-casing having an internal annular flange midway the ends thereof and an inwardly and upwardly extending seat at the lower end, of a suction-valve, a discharge-valve, valve-seats for said valves, a suction-tube, means for securing together the valve-seats and suction-tube, and means for securing them between the internal flange and the upwardly-extending seat, substantially as set forth.

2. In a valve mechanism for compressors or pumps, the combination, with a valve-casing having an internal annular flange midway the ends thereof and an inwardly and upwardly extending seat at the lower end, of a suction-valve, a discharge-valve, annular valve-seats for said valves, a suction-tube arranged above said valve-seats, a bottom disk for the valve-seats and suction-tube, a hanger-bolt connecting them together, and means for securing them between the flange and the upwardly-extending seat, substantially as set forth.

3. In a valve mechanism for compressors or pumps, the combination, with a valve-casing, of a suction-valve, a discharge-valve, seats for said valves, a suction-tube, a bottom disk for the valve-seats and suction-tube, a spider on the suction-tube, a hanger-bolt connecting the bottom disk with the spider, a seat in the lower part of said valve-casing for supporting the parts therein, an internal annular flange provided midway the ends of the valve-casing, and a ring bolted to said flange for securing the parts in the valve-casing, substantially as set forth.

4. In a valve mechanism, the combination, of a suction-tube, annular valve-seats arranged successively below said suction-tube and in line therewith, an annular discharge-valve provided at the lower end of the suction-tube and seated upon the upper one of said annular valve-seats, a suction-valve seated upon the lower annular valve-seat, a bottom disk, and a hanger-bolt for securing said suction-tube, valve-seats and bottom disk together, substantially as set forth.

5. In a valve mechanism, the combination, of a suction-tube having a reduced lower end, an annular upper valve-seat, an interior flange depending therefrom, an annular discharge-valve seated on said valve-seat and guided on the reduced lower end of said suction-tube, an annular lower valve-seat having an exterior flange depending therefrom, a suction-valve on the lower valve-seat, a bottom disk, and a hanger-bolt for securing the valve-seats, suction-tube and bottom disk together, substantially as set forth.

6. In a valve mechanism, the combination, with a valve-casing having an internal flange, of an annular suction-valve, an annular discharge-valve, valve-seats for the same, a suction-tube arranged in line with said valve-seats, said valve-seats and suction-tube being assembled and secured together, stud-bolts provided in said internal flange and a ring secured by said bolts for removably securing the assembled parts in position in the valve-casing, substantially as set forth.

In testimony that I claim the foregoing as my invention I have signed my name in presence of two subscribing witnesses.

RUDOLF BERG.

Witnesses:
 FERDINAND WENIG,
 HENRY BERG.